(No Model.)
J. F. KELLY & C. C. CHESNEY.
ELECTRIC MOTOR.
No. 507,658.                     Patented Oct. 31, 1893.
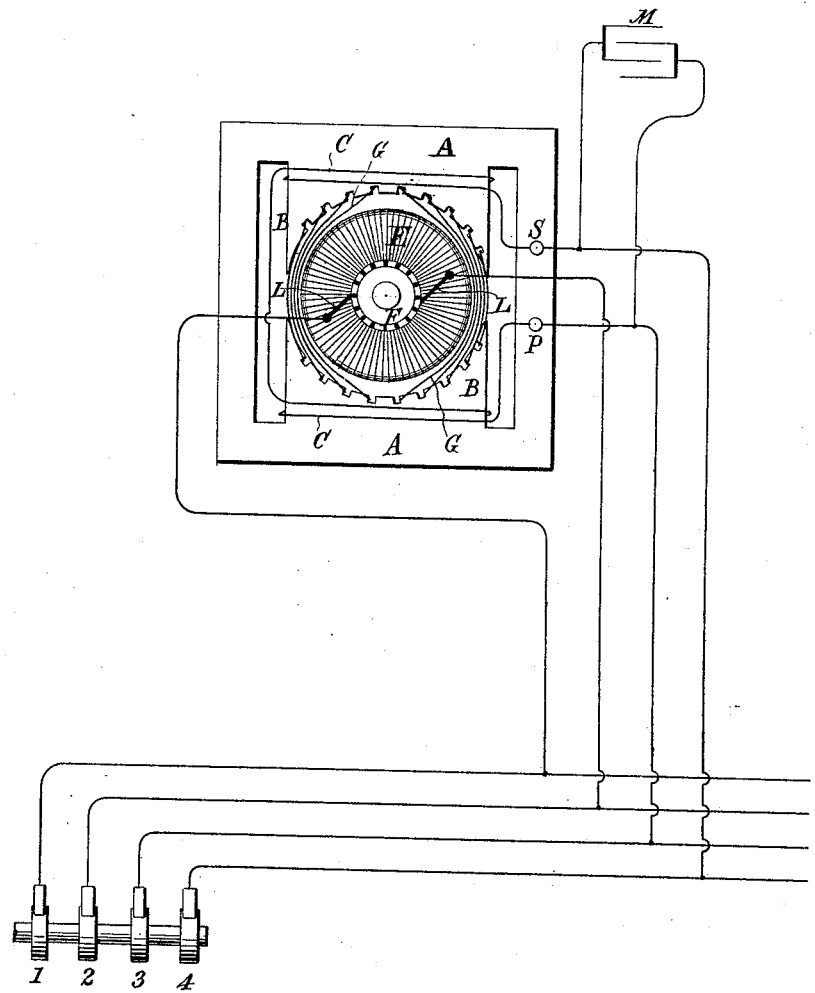
Witnesses:
Raphaël Netter
James Catlow
Inventors.
John F. Kelly
and Cummings C. Chesney.
by Duncan & Page,
Attorneys

UNITED STATES PATENT OFFICE.

JOHN F. KELLY AND CUMMINGS C. CHESNEY, OF PITTSFIELD, MASSACHUSETTS, ASSIGNORS TO THE STANLEY LABORATORY COMPANY, OF SAME PLACE.

ELECTRIC MOTOR.

SPECIFICATION forming part of Letters Patent No. 507,658, dated October 31, 1893.

Application filed December 7, 1892. Serial No. 454,339. (No model.)

*To all whom it may concern:*

Be it known that we, JOHN F. KELLY and CUMMINGS C. CHESNEY, citizens of the United States, residing at Pittsfield, in the county of Berkshire and State of Massachusetts, have invented certain new and useful Improvements in Electric Motors, of which the following is a specification, reference being had to the drawing accompanying and forming a part of the same.

The object of our invention is to effect by means of alternating currents the simultaneous magnetization and demagnetization of the field and armature cores respectively of a commutating motor which are required for its proper and efficient operation. Motors of this kind, that is to say, provided with armature coils connected with the segments of a commutator, may be operated by passing a single alternating current through the field and armature in series. They may also be operated by dividing the current between armature and field, if the two circuits be so adjusted as not to cause a material displacement of phase. These are facts well recognized in the art. We propose, however, a method or plan for the use of alternating currents with commutating motors, which is simple and efficient, and available in certain cases where the ordinary methods and apparatus could not be made effective.

In carrying out our invention we employ a commutating motor of ordinary type except that it is adapted for use with alternating currents by having its field as well as its armature core subdivided in the usual manner, and connect the field and armature circuits which are electrically independent respectively with two sources of electro-motive force differing approximately by ninety degrees in phase. The current passing through the field circuit will, or, by proper and well understood conditions, is made to lag approximately ninety degrees behind its electro-motive force, while the current in the armature is kept as nearly as possible in phase with its electro-motive force, as by the use of a supplemental stationary coil or winding parallel to the armature coil for the purpose of neutralizing the self-induction of the latter. Under such conditions the two currents will, therefore, be about one hundred and eighty degrees or no degrees apart, and consequently will work properly together in producing a rotation of the motor. The currents which are directed through the independent motor circuits may be obtained or derived from any proper source.

Our invention is not confined to the use of a motor of any special construction except in the particulars hereinbefore noted, and we therefore illustrate now more in detail the nature of the invention by a conventional representation of a commutating motor.

A designates the field having pole pieces B, B.

E is the armature, the coils on which are connected with the segments of the commutator F.

L, L, are the commutator brushes that conduct the current through the armature coils, and S, P, are the terminals of the coils C that energize the field magnets.

The field magnets and coils are constructed so as to produce a lag in the current passing through them, of approximately ninety degrees behind the electro-motive force, while to prevent any lag in the armature current or generally, in order to produce a difference of one hundred and eighty degrees between the armature and field currents, suitable provision is made, as by the employment of the neutralizing coil G. This coil is described in Patent No. 479,675, of July 26, 1892, but its nature and purpose are now well understood.

In practice we employ a condenser M in shunt about the field to neutralize the effect of the self-induction of the latter.

This plan of operating motors affords a desirable means of utilizing commutating motors in systems in which the currents are produced from independent sources, and differ by a quarter phase, and in the drawing we have represented such a system by the four collecting rings 1, 2, 3, 4, from which run the two circuits with which the field and armature of the motor are respectively connected.

What we claim is—

1. The method of operating commutating motors by alternating currents herein described, which consists in passing through the field and armature circuits respectively alternating currents differing in phase and proportioning and adjusting the said motor circuits so as to produce a correspondence in phase, substantially as and for the purpose set forth.

2. The combination with two sources of electro-motive force differing in phase, of a commutating motor with independent armature and field circuits connected respectively with the sources of electro-motive force and means, substantially as described, for increasing the lag of the current in the field circuit and reducing that of the current in the armature circuit, as set forth.

3. The combination with two sources of electro-motive force differing in phase, of a commutating motor with independent field and armature coils connected respectively with the sources of electro-motive force, and a stationary neutralizing coil in said motor surrounding the armature coils and parallel with the same, as set forth.

JOHN F. KELLY.
CUMMINGS C. CHESNEY.

Witnesses:
ERNEST B. CASTLE,
E. L. FRENCH.